United States Patent
Tsutsumi et al.

(10) Patent No.: US 9,759,255 B2
(45) Date of Patent: Sep. 12, 2017

(54) ROTATING SHAFT SUPPORT STRUCTURE

(71) Applicant: MITSUBISHI HITACHI POWER SYSTEMS, LTD., Kanagawa (JP)

(72) Inventors: Eiichi Tsutsumi, Tokyo (JP); Takahiro Kondo, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 14/777,144

(22) PCT Filed: Oct. 21, 2013

(86) PCT No.: PCT/JP2013/078451
§ 371 (c)(1),
(2) Date: Sep. 15, 2015

(87) PCT Pub. No.: WO2014/147878
PCT Pub. Date: Sep. 25, 2014

(65) Prior Publication Data
US 2016/0032963 A1   Feb. 4, 2016

(30) Foreign Application Priority Data
Mar. 19, 2013   (JP) .................... 2013-057294

(51) Int. Cl.
*F16C 23/04*   (2006.01)
*F16C 17/06*   (2006.01)
*F16C 17/24*   (2006.01)

(52) U.S. Cl.
CPC .............. *F16C 23/04* (2013.01); *F16C 17/06* (2013.01); *F16C 17/243* (2013.01)

(58) Field of Classification Search
CPC ......... F16C 17/06; F16C 17/24; F16C 23/043
See application file for complete search history.

(56) References Cited

U.S. PATENT DOCUMENTS 4,522,555 A   6/1985   Inoue et al.
6,089,754 A   7/2000   Wilkes et al.

FOREIGN PATENT DOCUMENTS

CH   DE 19929412 A1 * 12/2000 ............. F16C 17/06
CN   1256370   6/2000
(Continued)

OTHER PUBLICATIONS

Notification of Reason of Refusal issued Oct. 4, 2016 in Japanese Application No. 2013-057294, with English translation.
(Continued)

*Primary Examiner* — Phillip A Johnson
(74) *Attorney, Agent, or Firm* — Wenderoth, Lind & Ponack, L.L.P.

(57) ABSTRACT

The present invention addresses the problem of providing a rotary shaft supporting structure which is capable of supporting a rotary shaft for a longer period. This rotary shaft supporting structure, which supports a rotary shaft on which a thrust collar that protrudes outwards in the radial direction is formed, has: thrust bearings which face the thrust collar, and support, using support surfaces, the thrust collar surfaces that are orthogonal to the axial direction of the rotary shaft; and support mechanisms which support the thrust bearings in the axial direction from the surface side of support surfaces at the opposite side to the thrust collar. The sides of the support mechanisms that face the end surfaces of the thrust bearings are inclined in the direction orthogonal to the direction in which the rotary shaft tilts.

13 Claims, 14 Drawing Sheets

(56) References Cited

FOREIGN PATENT DOCUMENTS

| | | | | |
|---|---|---|---|---|
| CN | 102362086 | | 2/2012 | |
| GB | 191005035 A | * | 0/1911 | ............ F16C 17/04 |
| GB | 1110344 A | * | 4/1968 | ............ F16C 17/06 |
| JP | 58-56789 | | 4/1983 | |
| JP | 59-191418 | | 12/1984 | |
| JP | 5-231423 | | 9/1993 | |
| JP | 6-63929 | | 9/1994 | |
| JP | 8-338424 | | 12/1996 | |
| JP | 10-169655 | | 6/1998 | |
| JP | 10-246224 | | 9/1998 | |
| JP | 11-315828 | | 11/1999 | |
| JP | 2000-186712 | | 7/2000 | |
| JP | 2002-70853 | | 3/2002 | |
| JP | 2002-310142 | | 10/2002 | |
| JP | 2004-84557 | | 3/2004 | |
| JP | 2011-12799 | | 1/2011 | |
| JP | WO 2011004565 A1 | * | 1/2011 | ............ F01D 25/16 |
| JP | 2011-169418 | | 9/2011 | |
| JP | 2013-50144 | | 3/2013 | |

OTHER PUBLICATIONS

Notice of Allowance issued Oct. 13, 2016 in Korean Application No. 10-2015-7025362, with partial English translation.
Written Opinion of the International Searching Authority issued Nov. 12, 2013 in International (PCT) Application No. PCT/JP2013/078451, with English translation.
International Search Report issued Nov. 12, 2013 in International (PCT) Application No. PCT/JP2013/078451, with English translation.
First Office Action issued Dec. 19, 2016 in corresponding Chinese Application No. 201380074723.X, with English Translation.
Decision of Refusal dated May 8, 2017 in corresponding Japanese Application No. 2013-057294, with English translation.

* cited by examiner

THE UPSTREAM SIDE ⟺ THE DOWNSTREAM SIDE

ROTATING SHAFT SUPPORT STRUCTURE

TECHNICAL FIELD

The present invention relates to a rotating shaft support structure for supporting a rotating shaft in the thrust direction.

BACKGROUND ART

Rotary machines such as gas turbines and steam turbines are a mechanism which rotates a rotating shaft. Some of such rotary machines having a rotating shaft are provided with a thrust bearing in order to receive a thrust force and regulate the position of the rotating shaft in a direction parallel to the thrust direction. Some thrust bearings are provided with a mechanism for adjusting the mounting position.

In this connection, Patent Literature 1 describes a thrust bearing which is provided with an adjusting liner between the thrust bearing and a bearing case, on which the thrust bearing is mounted, to adjust the mounting position relative to the bearing case.

CITATION LIST

Patent Literature

[Patent Literature 1]
Japanese Patent Laid-Open No. 2002-70853

SUMMARY OF INVENTION

Technical Problem

The purpose of the adjusting liner is to adjust the axial position of the thrust bearing, using a member having a suitable uniform thickness, when the thrust bearing is mounted inside the bearing case. Therefore, even when the thrust bearing is mounted onto the rotating shaft with an adjustment mechanism such as the adjusting liner provided, the rotating shaft bends and inclines due to thermal expansion of the shaft or the casing, the shaft's own weight, etc. As a result, the surface of the thrust bearing in contact with the rotating shaft becomes non-uniformly loaded, and a larger load may act on one part of the contact surface than the rest. When the load acting on one part of the thrust bearing becomes so large that the thrust bearing is damaged and can no longer support the rotating shaft, operation of the rotary machine such as a gas turbine or a steam turbine may become impossible.

An object of the present invention, which solves the above-described problem, is to provide a rotating shaft support structure which can support a rotating shaft over a prolonged period of time.

Solution to Problem

In order to achieve the above object, the present invention provides a rotating shaft support structure for supporting a rotating shaft having a thrust collar protruding radially outward formed on it, the rotating shaft support structure including: a thrust bearing which faces the thrust collar and supports the surface of the thrust collar orthogonal to the axial direction of the rotating shaft by a support surface; and a support mechanism which supports the thrust bearing in the axial direction from the side opposite to the support surface supporting the thrust collar, wherein the side of the support mechanism facing the end surface of the thrust bearing is inclined in a direction orthogonal to a direction in which the rotating shaft inclines.

According to the present invention, it is possible to prevent a load from concentrating at one part of the thrust bearing in the rotation direction of the rotating shaft, and to prolong the service life of the thrust bearing. Accordingly, the rotating shaft can be supported over a prolonged period of time.

In the rotating shaft support structure of the present invention, the thrust bearing may be disposed on both sides in the axial direction across the thrust collar so as to face two surfaces, an upstream-side surface and a downstream-side surface, respectively, of the thrust collar orthogonal to the axial direction; the support mechanism may be composed of a first support mechanism disposed, in an extension direction of the rotating shaft, further on the downstream side than the thrust bearing disposed on the downstream side of the thrust collar, and a second support mechanism disposed, in the extension direction of the rotating shaft, further on the upstream side than the thrust bearing disposed on the upstream side of the thrust collar; the first support mechanism may be disposed such that the surface facing the upstream side faces the end surface in the axial direction of the thrust bearing disposed on the downstream side of the thrust collar, and that the surface facing the upstream side inclines toward the upstream side as it extends radially downward; and the second support mechanism may be disposed such that the surface facing the downstream side in the axial direction faces the end surface in the axial direction of the thrust bearing disposed on the upstream side of the thrust collar, and that the surface facing the downstream side inclines toward the downstream side in the axial direction as it extends radially upward.

According to the present invention, both ends in the thrust direction of the rotating shaft can be supported by the thrust bearings and the support mechanism, so that, in whichever direction the thrust force acts, it is possible to prevent the load from concentrating at one part of the thrust bearing and to prolong the service life of the thrust bearing.

In the rotating shaft support structure of the present invention, the support mechanism may include an adjusting liner fixed on the thrust bearing, and the adjusting liner may change gradually in thickness from the end in the radial direction toward the opposite end in the radial direction around the rotating shaft.

According to the present invention, it is possible to prevent a load from concentrating at one part of the thrust bearing in the rotation direction of the rotating shaft by adjusting the orientation of the thrust bearing with the adjusting liner, and to prolong the service life of the thrust bearing.

In the rotating shaft support structure of the present invention, the first support mechanism and the second support mechanism may each include an adjusting liner fixed on the thrust bearing; the adjusting liner may change gradually in thickness from the end in the radial direction toward the opposite end in the radial direction around the rotating shaft; and the adjusting liner of the first support mechanism may be disposed such that the direction in which the thickness changes radially is opposite to that of the adjusting liner of the second support mechanism.

According to the present invention, the surfaces of the first support mechanism and the second support mechanism facing each other are parallel to each other. Thus, the support mechanisms and the thrust bearing can come into contact with each other over a uniform surface, so that a uniform thrust load can be transmitted through the thrust collar.

In the rotating shaft support structure of the present invention, the support mechanism may have a casing in which the rotating shaft is held and which is disposed on the side of the thrust bearing opposite to the support surface, an adjustment mechanism having a plurality of bolts which are inserted into the casing and of which the end surfaces on the thrust bearing side are in contact with the thrust bearing; and in the adjustment mechanism, the plurality of bolts may be disposed around the rotating shaft, and the amount of travel of the bolts protruding from the casing may vary according to the position around the rotating shaft According to the present invention, it is possible to prevent a load from concentrating at one part of the thrust bearing in the rotation direction of the rotating shaft by adjusting the orientation of the thrust bearing through the positions of the bolts, and to prolong the service life of the thrust bearing. In addition, it is easy to make fine adjustment.

In the rotating shaft support structure of the present invention, the support mechanism may have a casing in which the rotating shaft is held and which is disposed on the side of the thrust bearing opposite to the support surface; the casing may support the thrust bearing from the surface opposite to the support surface; and the supporting surface of the casing may be inclined from the vertical direction.

According to the present invention, it is possible to prevent a load from concentrating at one part of the thrust bearing in the rotation direction of the rotating shaft by adjusting the orientation of the thrust bearing through machining of the casing, and to prolong the service life of the thrust bearing.

In the rotating shaft support structure of the present invention, the support mechanism may include the support surface of the thrust bearing, and the support surface may be inclined from the vertical direction.

According to the present invention, it is possible to prevent a load from concentrating at one part of the thrust bearing in the rotation direction of the rotating shaft by adjusting the orientation of the thrust bearing through machining of the thrust bearing, and to prolong the service life of the thrust bearing.

In the rotating shaft support structure of the present invention, the thrust bearing may have a plurality of pads which are disposed on the support surface in the circumferential direction of the rotating shaft and slide with the thrust collar, and pad support means which supports the pads from the surface opposite to the support surface and is supported by the support mechanism; and the pad support means may support the pads so as to be movable relative to a plane perpendicular to the rotating shaft.

According to the present invention, since the pads are movable, it is possible to prevent a load from concentrating at one part of the thrust bearing in the rotation direction of the rotating shaft by the movement of the pads as well, and to prolong the service life of the thrust bearing.

Advantageous Effects of Invention

According to the rotating shaft support structure of the present invention, it is possible to incline the thrust bearing according to the inclination of the rotating shaft by inclining the end surface of the support mechanism, which supports the thrust bearing, according to the inclination of the rotating shaft. Thus, it is possible to prevent a load from concentrating at one part of the thrust bearing in the rotation direction of the rotating shaft, and to prolong the service life of the thrust bearing. In addition, the rotating shaft can be supported over a prolonged period of time.

DESCRIPTION OF EMBODIMENTS

In the following, a preferred embodiment of a rotating shaft support structure according to the present invention will be described in detail with reference to the accompanying drawings. The present invention is not limited by this embodiment, and where there are a plurality of embodiments, the present invention also includes embodiments configured by combining such embodiments.

In the following embodiment, a case where a rotating shaft of a gas turbine is supported by a bearing device will be described. The bearing device includes a thrust bearing mechanism which is one example of the rotating shaft support structure of this embodiment. The thrust bearing mechanism, which is one example of the rotating shaft support structure, is a mechanism for supporting a rotating shaft in the thrust direction (the axial direction of the rotating shaft), and is disposed between a casing and the rotating shaft. The thrust bearing mechanism has two thrust bearings respectively facing two end surfaces in the axial direction of a thrust collar of the rotating shaft, and a support mechanism disposed between each thrust bearing and the casing. The thrust bearing has a plurality of bearing pads which support a load from the thrust collar, a leveling mechanism which supports the bearing pads, and a housing which houses the bearing. The support mechanism includes adjusting liners disposed so as to respectively correspond to the thrust bearings.

[Embodiments]

Figure 1:
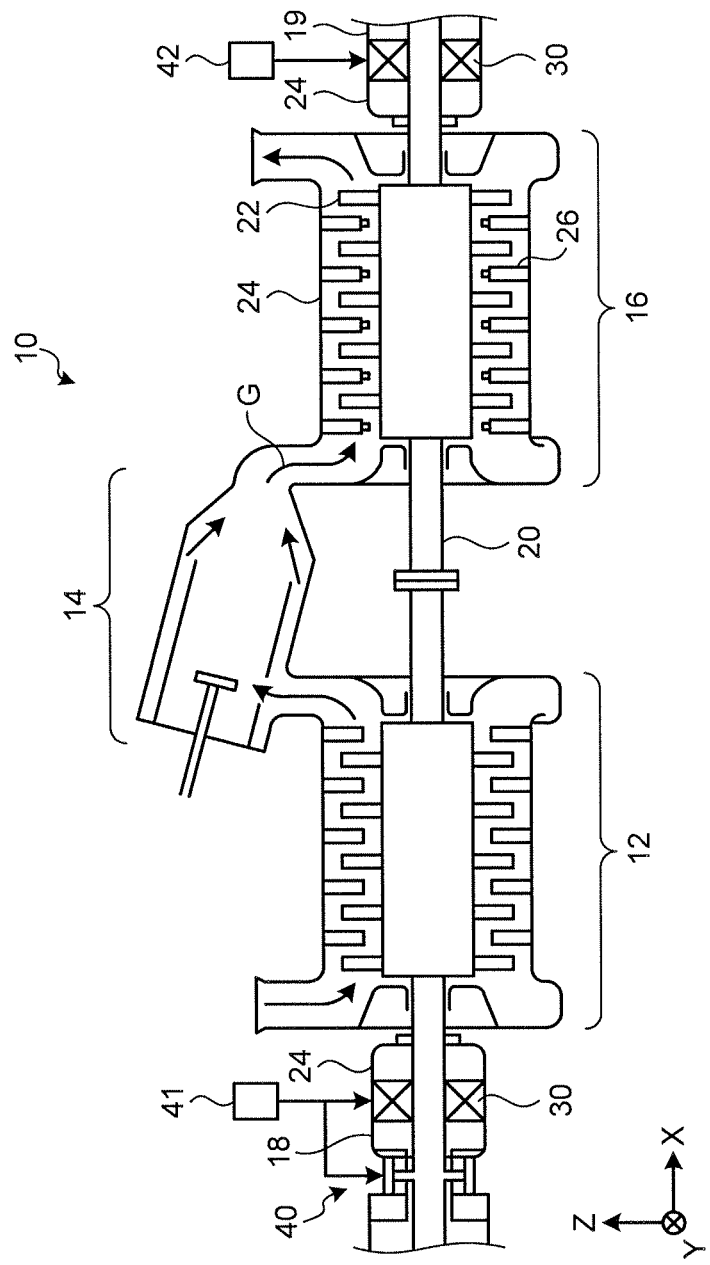
FIG. 1 is a view showing the schematic configuration of a gas turbine including a thrust bearing mechanism which is one embodiment of a rotating shaft support structure.

FIG. 1 is a view showing the schematic configuration of a gas turbine including the thrust bearing mechanism which is one example of the rotating shaft support structure. As shown in FIG. 1, a gas turbine 10 has a compressor 12, a combustor 14, a turbine 16, a bearing device 18, a bearing device 19, and a rotating shaft 20. The parts of the gas turbine 10 are disposed inside a casing 24. In the gas turbine 10, a part of the compressor 12 and a part of the turbine 16 are fixed on the rotating shaft 20 and rotate with the rotating shaft 20. The compressor 12 takes in and compresses air. The air compressed in the compressor 12 is supplied to the combustor 14. The combustor 14 mixes fuel into the air compressed in the compressor 12 and generates combustion gas G The turbine 16 introduces the combustion gas G generated in the combustor 14 to the inside thereof, expands the combustion gas G and sprays it against blades 22 provided on the rotating shaft 20, to thereby convert the thermal energy of the combustion gas G into mechanical rotary energy and generate power.

Specifically, as shown in FIG. 1, the turbine 16 includes the rotating shaft 20, the plurality of blades 22 provided on the rotating shaft 20, the casing 24 housing the rotating shaft 20 and the blades 22, and a plurality of vanes 26 fixed on the casing 24. In the turbine 16, the blades 22 and the vanes 26 are alternately arrayed in the axial direction of the rotating shaft 20. The blades 22 rotate the rotating shaft 20 with the combustion gas G which is jetted from the combustor 14 and flows in the axial direction of the rotating shaft 20. The rotary energy of the rotating shaft 20 is taken out by a mechanism, for example, a generator, coupled with the rotating shaft 20.

The bearing device 18 is provided at the end of the rotating shaft 20 on the compressor 12 side. The bearing device 18 has a journal bearing mechanism 30, a thrust bearing mechanism 40, and a lubricating oil supply mechanism 41. The journal bearing mechanism 30 is fixed on the casing 24, receives the radial load of the rotating shaft 20, and regulates the radial movement of the rotating shaft 20 relative to the casing 24. The thrust bearing mechanism 40 is fixed on the casing 24, receives the axial load of the rotating shaft 20, and regulates the axial movement of the rotating shaft 20 relative to the casing 24. The lubricating oil supply mechanism 41 supplies lubricating oil to the journal bearing mechanism 30 and the thrust bearing mechanism 40, and recovers and circulates the lubricating oil.

The bearing device 19 is provided at the end of the rotating shaft 20 on the turbine 16 side. The bearing device 19 has a journal bearing mechanism 30 and a lubricating oil supply mechanism 42. The journal bearing mechanism 30 is fixed on the casing 24, receives the radial load of the rotating shaft 20, and regulates the radial movement of the rotating shaft 20 relative to the casing 24. The lubricating oil supply mechanism 42 supplies lubricating oil to the journal bearing mechanism 30, and recovers and circulates the lubricating oil. The gas turbine 10 is thus configured, and the bearing devices 18, 19 support the rotating shaft 20 on the casing 24.

Figure 2:
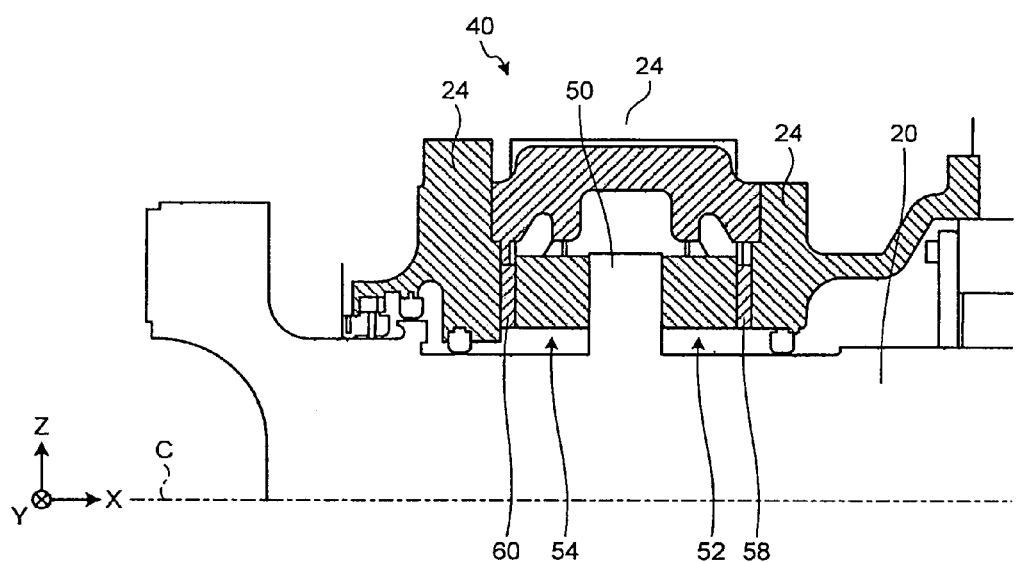
FIG. 2 is a cross-sectional view showing the schematic configuration of the thrust bearing mechanism of the embodiment.
Figure 3:
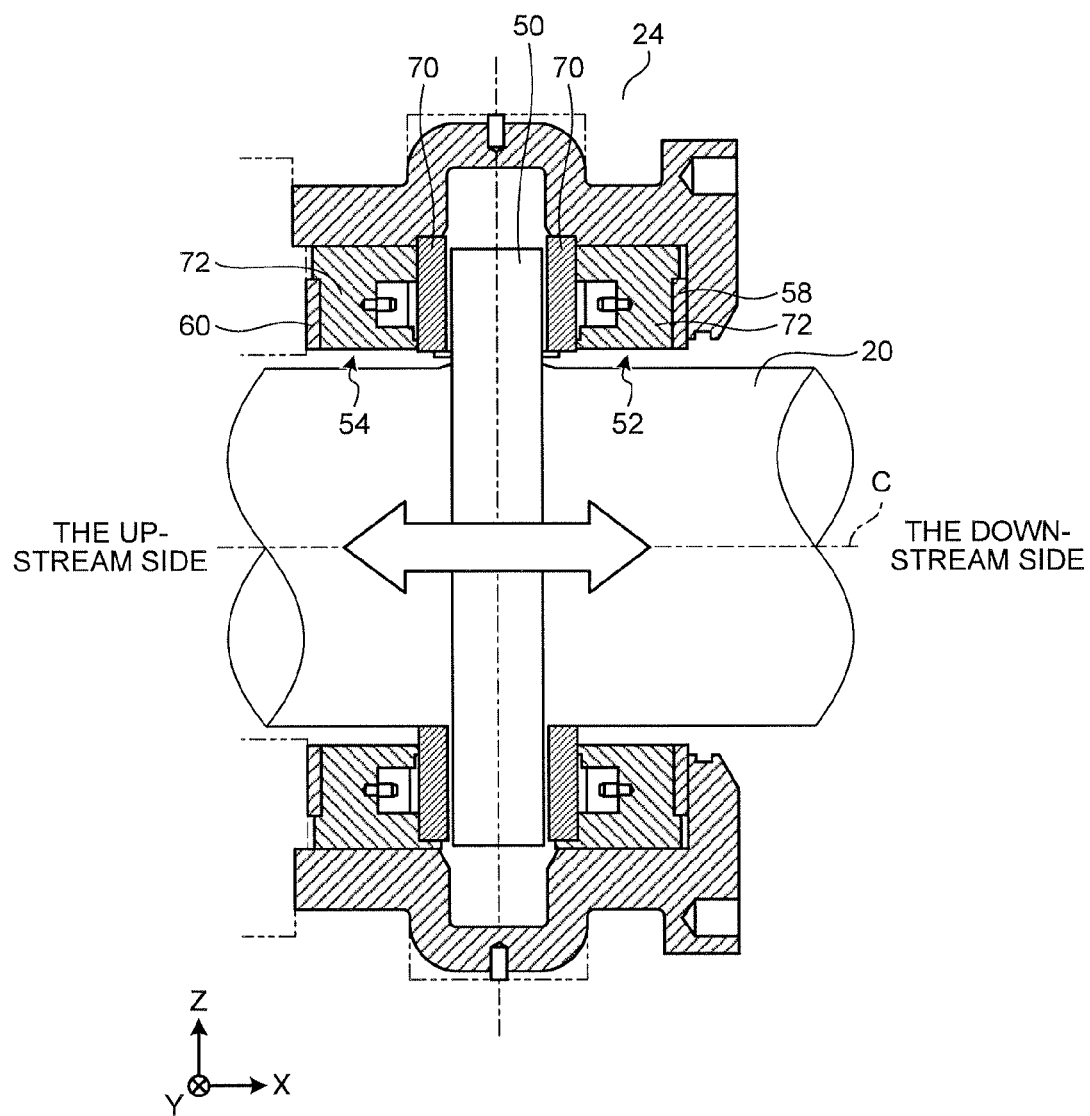
FIG. 3 is a cross-sectional view showing the schematic configuration of the thrust bearing mechanism of the embodiment.

Next, the thrust bearing mechanism 40, which is one example of the rotating shaft support structure for supporting the rotating shaft 20, will be described using FIG. 2 to FIG. 12. In this embodiment, to make the configuration easy to understand, a portion of each part which is inclined from the vertical direction or the horizontal direction is shown with a larger inclination than its actual inclination, namely, with an enlarged inclination angle. First, the schematic configuration of the thrust bearing mechanism 40 will be described using FIG. 2 and FIG. 3. FIG. 2 is a cross-sectional view showing the schematic configuration of the thrust bearing mechanism of this embodiment. FIG. 3 is a cross-sectional view showing the schematic configuration of the thrust bearing mechanism of this embodiment. In the following description, the axial direction refers to a direction in which the rotating shaft 20 extends (X-axis direction shown in FIG. 1), and the radial direction refers to a direction orthogonal to the rotating shaft 20 (Z-axis direction and Y-axis direction in FIG. 1). The radially outward refers to a direction away from the rotating shaft 20, and the radially inward refers to a direction closer to the rotating shaft 20. For convenience, the right side on the sheet of FIG. 1 is referred to as the downstream side (the turbine 16 side viewed from the compressor 12 side), and the left side is referred to as the upstream side (the compressor 12 side viewed from the turbine 16 side). The vertical direction refers to a direction perpendicular to the horizontal plane. The thrust bearing mechanism 40 of this embodiment is disposed further on the upstream side than the center of the rotating shaft 20. Therefore, the portion of the rotating shaft 20 on the upstream side from the installation position of the thrust bearing mechanism 40 is short while the portion on the downstream side is long.

As shown in FIG. 2 and FIG. 3, the thrust bearing mechanism 40 is disposed so as to correspond to a thrust collar 50 provided on the rotating shaft 20. The thrust collar 50 protrudes radially outward from the rotating shaft 20. The thrust bearing mechanism 40 has both ends in the axial direction held by the casing 24. That is, as both ends in the axial direction of the thrust bearing mechanism 40 are fixed on the casing 24, the axial position of the thrust bearing mechanism 40 is fixed. The thrust bearing mechanism 40 has thrust bearings 52, 54 and a support mechanism 56.

The thrust bearings 52, 54 are disposed on the upstream side and the downstream side in the axial direction across the thrust collar 50. The thrust bearing 52 is disposed further on the downstream side than the thrust collar 50 in the axial direction, and faces the surface of the thrust collar 50 orthogonal to the rotating shaft 20. The thrust bearing 54 is disposed further on the upstream side than the thrust collar 50 in the axial direction, and faces the surface of the thrust collar 50 on the upstream side of the rotating shaft 20.

Figure 4:
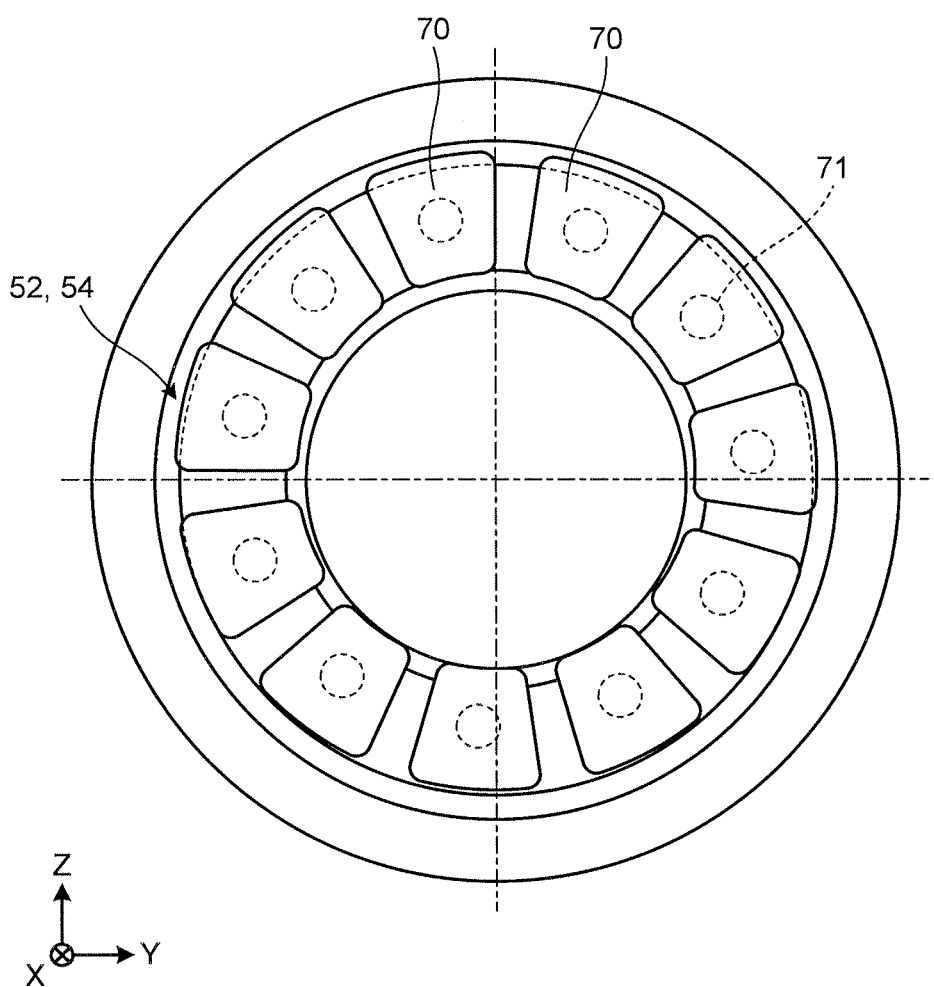
FIG. 4 is a front view showing the schematic configuration of the thrust bearing of the embodiment.
Figure 5:
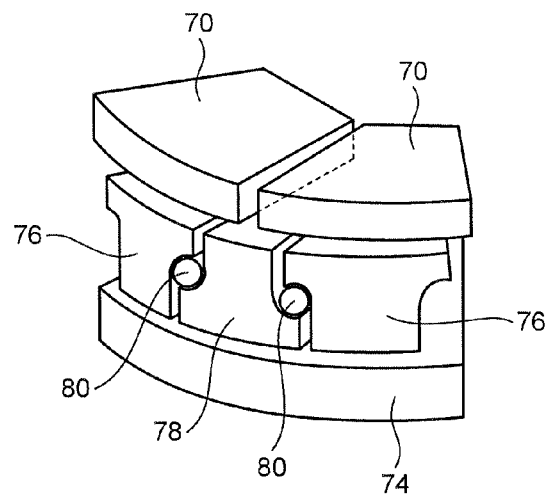
FIG. 5 is a perspective view showing a part of the thrust bearing shown in FIG. 4.
Figure 6:
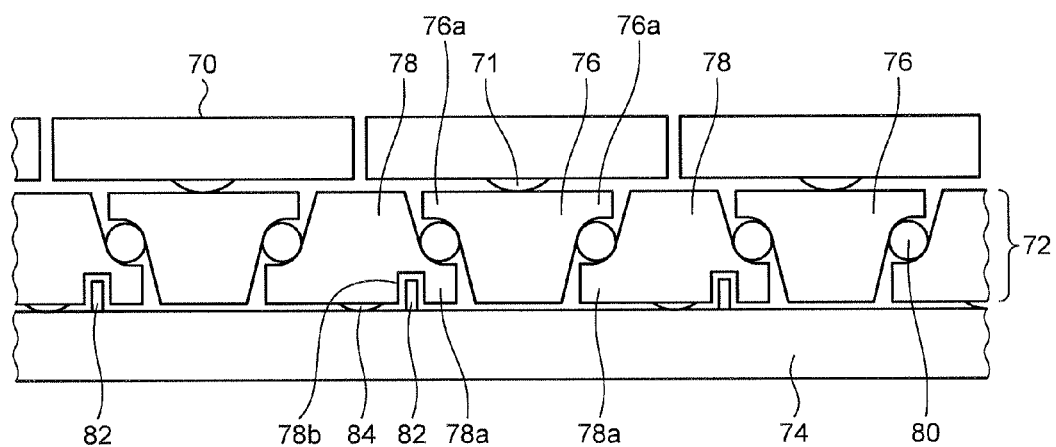
FIG. 6 is an exploded side view showing a part of the thrust bearing shown in FIG. 4.

Next, the thrust bearings will be described using FIG. 4 to FIG. 6. Since the thrust bearing 52 and the thrust bearing 54 are of the same configuration, with the only difference being their positions, the thrust bearing 54 will be used for description. FIG. 4 is a front view showing the schematic configuration of the thrust bearing of this embodiment. FIG. 5 is a perspective view showing a part of the thrust bearing shown in FIG. 4. FIG. 6 is an exploded side view showing a part of the thrust bearing shown in FIG. 4.

The thrust bearing 54 is disposed so as to face the surface of the thrust collar 50 orthogonal to the rotating shaft 20, bears the axial thrust load, and regulates the axial movement of the thrust collar 50. The thrust bearing 54 is a so-called tilting pad bearing with a leveling function, and has a plurality of bearing pads (tilting pads) 70 which support the load from the thrust collar 50, a leveling mechanism 72 which supports the bearing pads 70, and a housing 74 which houses the bearing. The leveling mechanism 72 has upper leveling plates 76 which receive the load from the bearing pads 70, lower leveling plates 78 which receive the load from the upper leveling plates 76, connection pins 80 which are disposed between the respective upper leveling plates 76 and lower leveling plates 78 and transmit the load received from both leveling plates, and movement stop pins 82 which restrict the movement of the lower leveling plates 78 relative to the housing 74.

The plurality of bearing pads 70 are of the same shape, and disposed at positions facing the thrust collar 50 around the rotating shaft 20 at equal intervals in the circumferential direction, symmetrically relative to a rotating shaft center C. Lubricating oil is supplied from the lubricating oil supply mechanism 41 to the bearing pads 70, and a lubricating oil film is formed on the surfaces of the bearing pads 70 facing the thrust collar 50. Thus, the lubricating oil film is formed between the bearing pads 70 and the thrust collar 50, so that friction etc. occurring between the thrust collar 50 and the bearing pads 70 during rotation of the thrust collar 50 can be reduced. The bearing pads 70 each have a pivot 71 near the center of the surface opposite to the surface facing the thrust collar 50, namely, of the surface facing the upper leveling plate 76. The pivot 71 is a support member having a spherical convex surface and comes into contact with the upper leveling plate 76. By coming into contact with the upper leveling plate 76 through the pivot 71, the bearing pad 70 can tilt around the pivot 71 relative to the upper leveling plate 76. Here, corotation prevention means, similar to the movement stop pin 82 to be described later, is provided between the bearing pad 70 and the upper leveling plate 76.

The housing 74 is a support member, a support structure, or a support foundation which receives the load transmitted from the thrust collar 50 to the bearing pads 70, and further transmitted through the upper leveling plates 76, the connection pins 80, and the lower leveling plates 78 to the housing 74. The housing 74 is a member located on the surface opposite to the surface facing the thrust collar 50 in the axial direction. An adjusting liner 60 is fixed on the housing 74 from the upstream side in the axial direction.

The leveling mechanism 72 is disposed between the bearing pads 70 and the housing 74, and has the upper leveling plates 76 and the lower leveling plates 78. The upper leveling plates 76 and the lower leveling plates 78 are disposed alternately in the circumferential direction of the rotating shaft 20. The lower leveling plates 78 each have a pivot 84 in the central part of the surface on the housing 74 side. The pivot 84 is a spherical convex support member and is in contact with the housing 74. Each lower leveling plate 78 can tilt around a point at which the pivot 84 is in contact with the upper surface of the housing 74.

The leveling mechanism 72 has the connection pins 80 between the respective upper leveling plates 76 and lower leveling plates 78. The upper leveling plates 76 and the lower leveling plates 78 are provided with load receiving projection portions 76a, 78a, respectively, at the end in the rotation direction of the rotating shaft 20. The connection pin 80 has a circular columnar shape, and is disposed between the load receiving projection portions 76a, 78a of the upper leveling plate 76 and the lower leveling plate 78 such that the radial direction coincides with the axial direction of the circular columnar shape of the connection pin 80.

The upper leveling plates 76, the connection pins 80, and the lower leveling plates 78 are disposed symmetrically around the rotating shaft 20. The lower leveling plate 78 has a concave hole 78b formed in the lower surface, and the housing 74 is provided with the movement stop pin 82 which is shaped so as to be fitted in this concave hole 78b.

In the leveling mechanism 72, the load from the bearing pads 70 is transmitted to the housing 74 through the pivots 71, the upper leveling plates 76, the connection pins 80, the lower leveling plates 78, and the pivots 84.

The thrust bearing 54 receives the load from the thrust collar 50 by the bearing pads 70, and regulates the axial position of the thrust collar 50. The thrust bearing 54 is a sliding bearing, and even when the thrust collar 50 rotates, the bearing pads 70 support the thrust collar 50 in the axial direction without rotating themselves. As the combination of the upper leveling plates 76, the connection pins 80, and the lower leveling plates 78 allows the upper leveling plates 76 and the lower leveling plates 78 to interlock with each other in the circumferential direction to adjust the positions of the bearing pads 70, the thrust bearing 54 can equalize the load borne by the bearing pads 70 in the circumferential direction of the rotating shaft 20.

Figure 7:
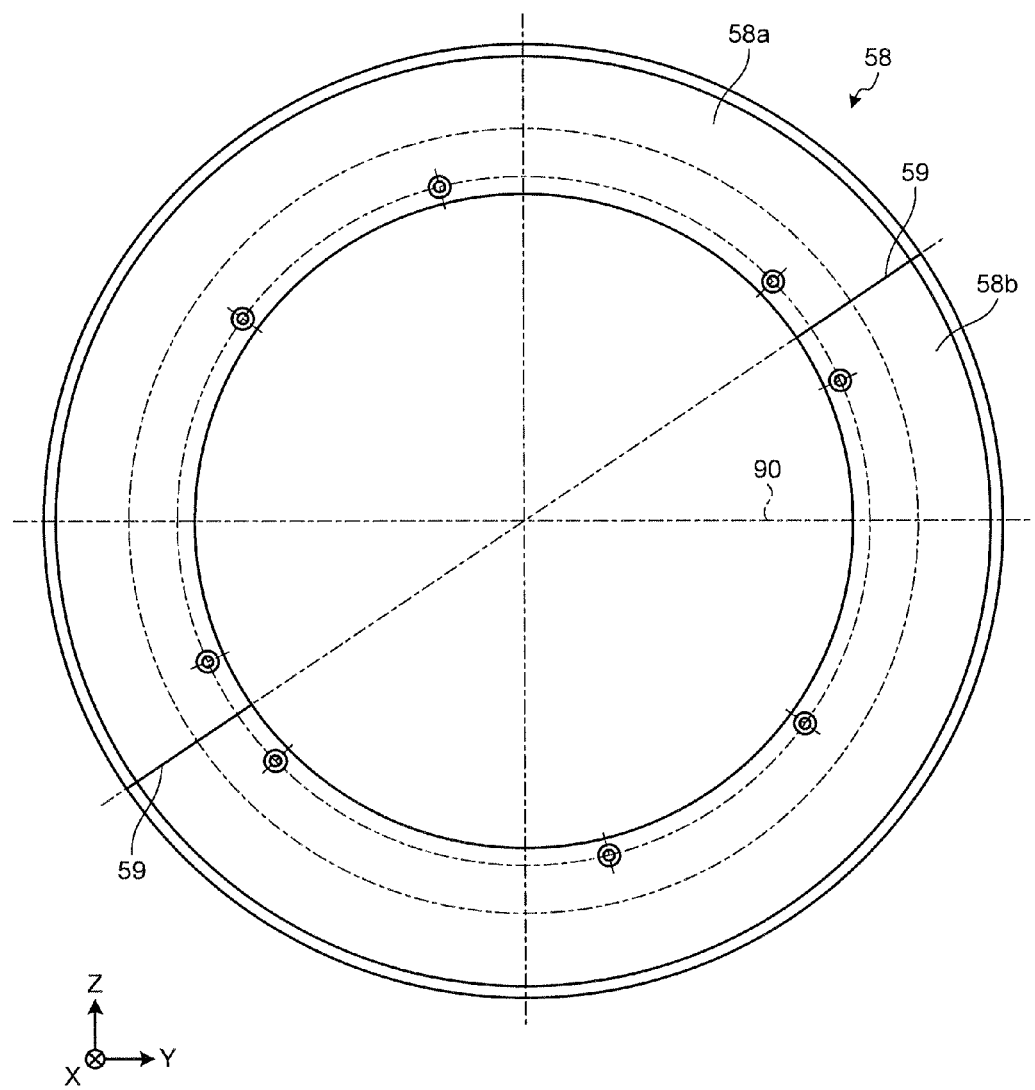
FIG. 7 is a front view showing the schematic configuration of an adjusting liner according to a first support mechanism of the embodiment.
Figure 8:
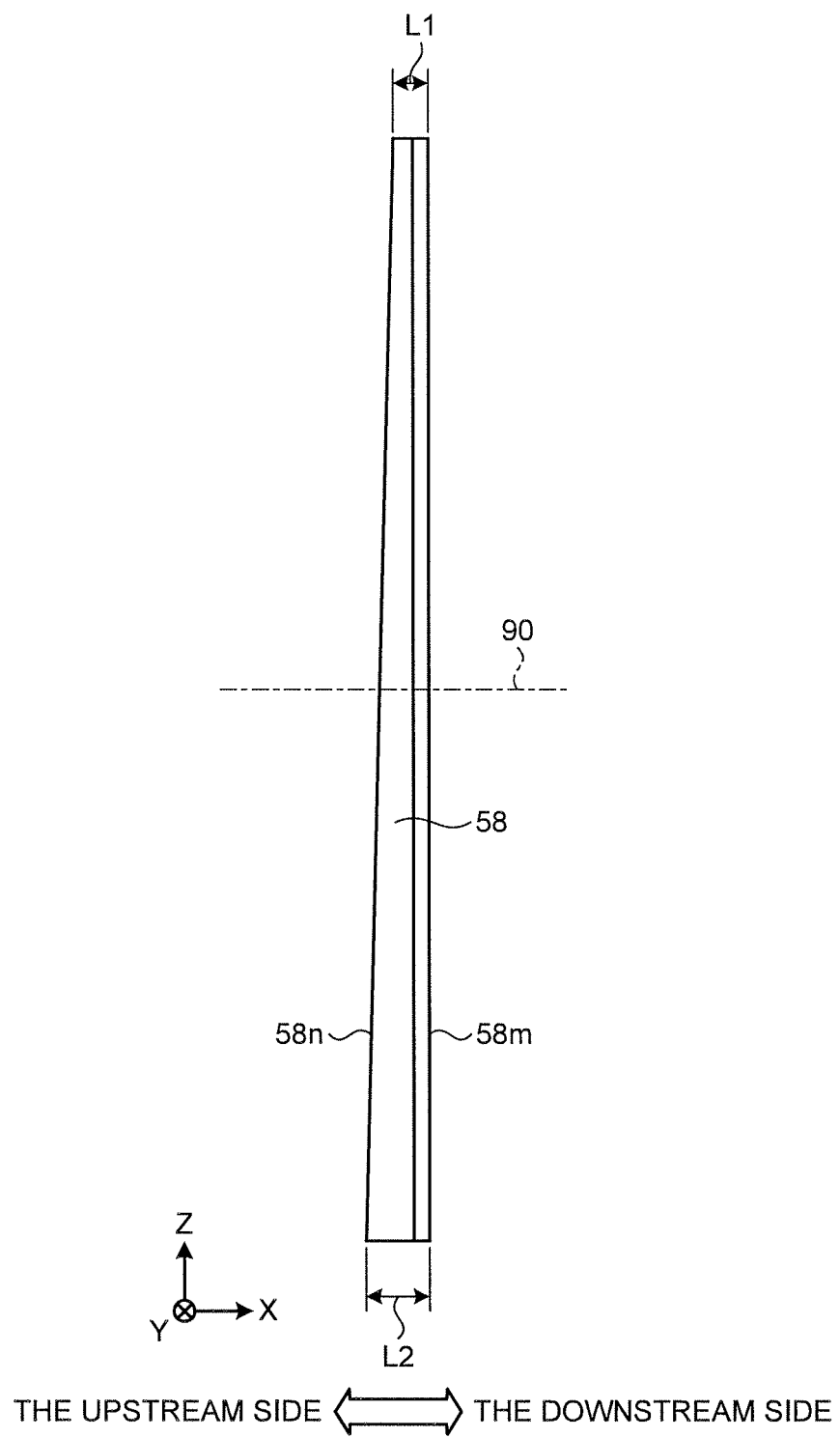
FIG. 8 is a side view showing the schematic configuration of the adjusting liner shown in FIG. 7.
Figure 9:
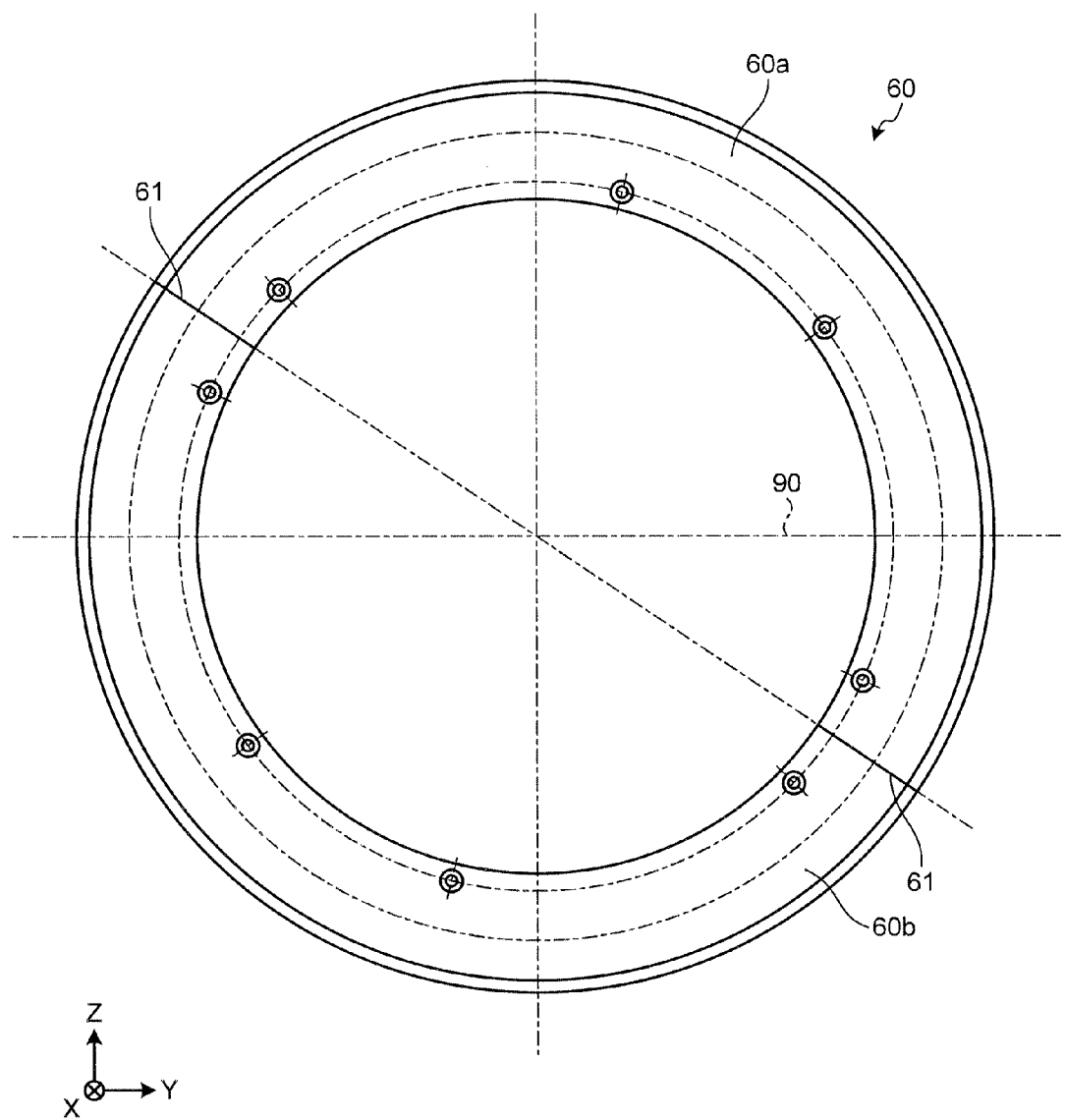
FIG. 9 is a front view showing the schematic configuration of an adjusting liner according to a second support mechanism of the embodiment.
Figure 10:
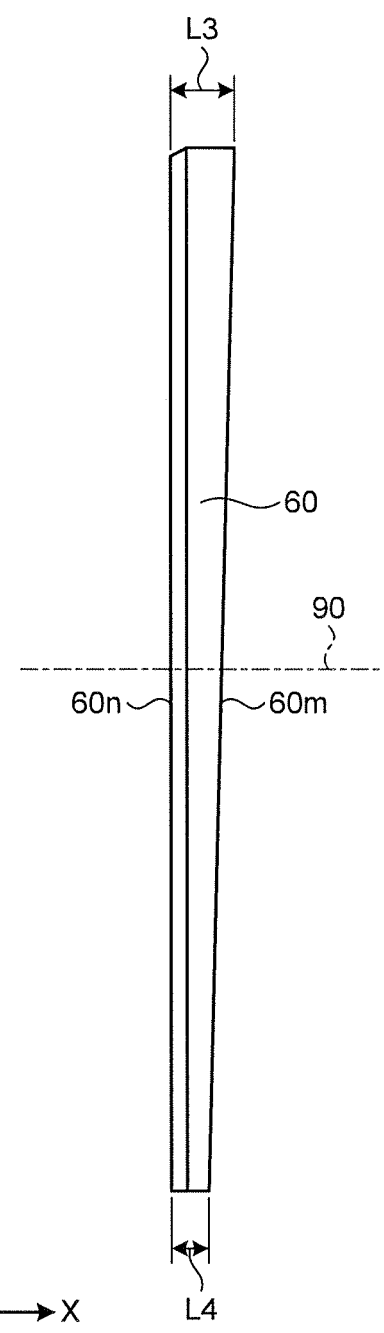
FIG. 10 is a side view showing the schematic configuration of the adjusting liner shown in FIG. 9.
Figure 11:
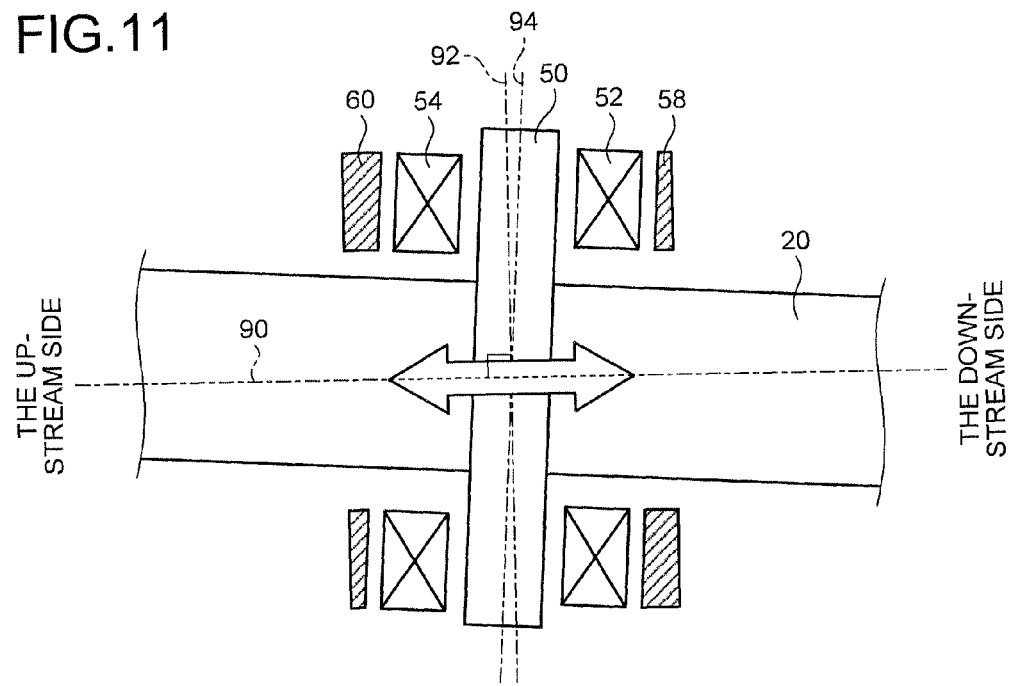
FIG. 11 is a view illustrating the function of the thrust bearing mechanism of the embodiment.
Figure 12:
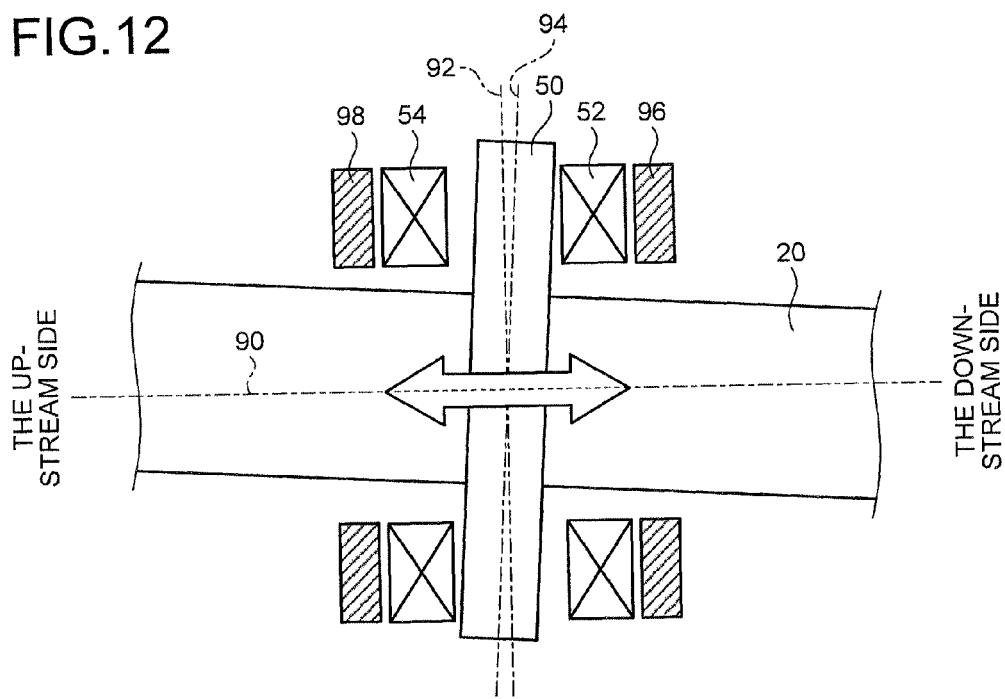
FIG. 12 is a view illustrating the function of a thrust bearing mechanism of a comparative example.

Next, the support mechanism 56 will be described using FIG. 7 to FIG. 12 in addition to FIG. 2 and FIG. 3. FIG. 7 is a front view showing the schematic configuration of the adjusting liner according to a first support mechanism of this embodiment. FIG. 8 is a side view showing the schematic configuration of the adjusting liner shown in FIG. 7. FIG. 9 is a front view showing the schematic configuration of the adjusting liner according to a second support mechanism of this embodiment. FIG. 10 is a side view showing the schematic configuration of the adjusting liner shown in FIG. 9. FIG. 11 is a view illustrating the function of the thrust bearing mechanism of this embodiment. FIG. 12 is a view illustrating the function of a thrust bearing mechanism of a comparative example.

The support mechanism 56 has a structure with two adjusting liners, the adjusting liner (first support mechanism) 58 and the adjusting liner (second support mechanism) 60, used in combination. While the two adjusting liners 58, 60 may be of the same shape, they are different in mounting method. That is, when mounting the thrust bearings 52, 54 inside the casing 24, it is necessary to mount the thrust bearings 52, 54 such that the directions in which the adjusting liners 58, 60 change radially in thickness are opposite to each other according to the inclination of the shaft. Even when the shaft inclines, the casing 24 housing the thrust bearings 52, 54 always maintains its horizontal plane (levelness). Of the casing 24 of this embodiment, the end surface on the downstream side in the axial direction which supports the thrust bearing 52 in the axial direction defines a plane orthogonal to the horizontal plane, and the end surface on the upstream side in the axial direction which supports the thrust bearing 54 in the axial direction defines a plane orthogonal to the horizontal plane. In the following, the structure of the adjusting liners, including the difference between these adjusting liners, will be described.

The adjusting liner 58 is disposed on the surface of the thrust bearing 52 on the downstream side in the axial direction, and is fixed on the thrust bearing 52. The surface of the adjusting liner 58 on the downstream side in the axial direction is in contact with the casing 24. As both its ends in the axial direction come into contact with the thrust bearing 52 and the casing 24, respectively, the adjusting liner 58 holds the axial position of the thrust bearing 52 relative to the casing 24 at a predetermined position.

As shown in FIG. 7 and FIG. 8, the adjusting liner 58 is formed annularly around the rotating shaft 20, and changes uniformly in thickness, from one circumferential end surface toward the other circumferential end surface in the radial direction, along the line passing through the rotating shaft center C and connecting the circumferential end surfaces on both sides in the radial direction. The adjusting liner 58 is a member which is divided into two members, an annular member 58a and an annular member 58b, in the circumferential direction. The adjusting liner 58 assumes the shape of one ring as a whole when the two annular members 58a, 58b are disposed with division surfaces 59, which are surfaces of the annular members 58a, 58b formed in the radial direction, in contact with each other. Here, the division surfaces 59 are positioned so as to be inclined by a predetermined angle from a horizontal direction (direction parallel to the horizontal plane of the casing 24) 90. This makes it easy to fit the two annular members 58a, 58b in a correct arrangement during mounting.

As shown in FIG. 8, the adjusting liner 58 changes in thickness, from one circumferential end surface toward the other circumferential end surface in the radial direction, along the line passing through the rotating shaft center C and connecting the circumferential end surfaces on both sides in the radial direction. Specifically, the adjusting liner 58 has a shape with the thickness increasing from the radially upper side toward the radially lower side on the sheet of FIG. 8, and the relation between the thickness (minimum thickness) L1 of the circumferential end surface on the radially upper side and the thickness (maximum thickness) L2 of the circumferential end surface on the radially lower side is expressed as L1<L2. Of the adjusting liner 58, an end surface 58 m facing the downstream side defines a plane perpendicular to the horizontal plane of the casing 24, while an end surface 58n facing the upstream side defines a plane inclined from the plane perpendicular to the horizontal plane of the casing 24. The end surface 58m is the end surface of the adjusting liner 58 on the downstream side in the axial direction. The end surface 58n is the end surface of the adjusting liner 58 on the upstream side in the axial direction.

Thus, the end surface 58m of the adjusting liner 58 facing the downstream side is in contact with the surface of the casing 24 perpendicular to the horizontal plane.

The end surface 58n facing the upstream side, which is inclined from the surface of the casing 24 perpendicular to the horizontal plane, is fixed on the thrust bearing 52. Therefore, the surfaces of the thrust bearing 52 facing the upstream side and the downstream side in the axial direction can be oriented with an inclination from the horizontal plane of the casing 24.

The adjusting liner 60 is disposed on the surface of the thrust bearing 54 on the upstream side in the axial direction, and is fixed on the thrust bearing 54 from the axial direction. The surface of the adjusting liner 60 on the upstream side in the axial direction is in contact with the casing 24. As both its end surfaces 60m, 60n in the axial direction come into contact with the thrust bearing 54 and the casing 24, respectively, the adjusting liner 60 holds the axial position of the thrust bearing 54 relative to the casing 24 at a predetermined position.

As shown in FIG. 9 and FIG. 10, the adjusting liner 60 is formed annularly around the rotating shaft 20, and changes uniformly in thickness, from one circumferential end surface toward the other circumferential end surface in the radial direction, along the line passing through the rotating shaft center C and connecting the circumferential end surfaces on both sides in the radial direction. The adjusting liner 60 is a member which is divided into two members, an annular member 60a and an annular member 60b, in the circumferential direction. The adjusting liner 60 assumes the shape of one ring as a whole as the two annular members 60a, 60b are disposed with division surfaces 61, at which they are divided in the radial direction, in contact with each other. Here, the division surfaces 61 are positioned so as to be inclined by a predetermined angle from the horizontal direction (direction parallel to the horizontal plane of the casing) 90. This makes it easy to fit the two annular members 60a, 60b in a correct arrangement during mounting.

As shown in FIG. 10, the adjusting liner 60 changes in thickness, from one circumferential end surface toward the other circumferential end surface in the radial direction, along the line passing through the rotating shaft center C and connecting the circumferential end surfaces on both sides in the radial direction. Specifically, the adjusting liner 60 has a shape with the thickness decreasing from the radially upper side toward the radially lower side on the sheet of FIG. 10, and the relation between the thickness (maximum thickness) L3 of the circumferential end surface on the radially upper side and the thickness (minimum thickness) 4 of the circumferential end surface on the radially lower side is expressed as L4<L3. Of the adjusting liner 60, the end surface 60n facing the upstream side defines a plane parallel to the surface of the casing 24 perpendicular to the horizontal plane, while the end surface 60m facing the downstream side defines a plane inclined from the surface of the casing 24 perpendicular to the horizontal plane. The end surface 60m is the end surface of the adjusting liner 60 on the downstream side in the axial direction. The end surface 60n is the end surface of the adjusting liner 60 on the upstream side in the axial direction.

Thus, the end surface 60n of the adjusting liner 60 facing the upstream side is in contact with the surface of the casing 24 perpendicular to the horizontal plane, while the end surface 60m thereof facing the downstream side is fixed on the thrust bearing 54 which forms a surface inclined from the surface of the casing 24 perpendicular to the horizontal plane. Therefore, the end surfaces of the thrust bearing 54 facing the upstream side and the downstream side in the axial direction can be oriented with an inclination from the horizontal plane of the casing 24.

The thrust bearing mechanism (rotating shaft support structure) 40 is mounted with the two adjusting liners 58, 60 positioned such that the directions, in which the adjusting liners 58, 60 change radially in thickness along the line passing through the rotating shaft center C, are opposite to each other. For example, the adjusting liners 58, 60 should be mounted such that the position of the circumferential end of the adjusting liner 58 having the minimum thickness L1 in the axial direction and the position of the circumferential end of the adjusting liner 60 having the maximum thickness L3 coincide with each other in the circumferential direction. When the adjustment liners 58, 60 are mounted in this way, the position of the circumferential end of the adjusting liner 58 having the maximum thickness L2 in the axial direction and the position of the circumferential end of the adjusting liner 60 having the minimum thickness L4 in the axial direction also coincide with each other in the circumferential direction. That is, mounting the adjusting liners 58, 60 thus in combination can incline the surface (end surface 58n facing the upstream side) of the adjusting liner 58 on the thrust bearing 52 side and the surface (end surface 60m facing the downstream side) of the adjusting liner 60 on the thrust bearing 54 side. Moreover, inclining the end surfaces 58n, 60m of the adjusting liners can form parallel surfaces, so that the surfaces of the thrust bearings 52, 54 in contact with the thrust collar 50 can be inclined from the surface of the casing 24 perpendicular to the horizontal plane and at the same time can be held parallel to each other.

Here, as shown in FIG. 11, even when the rotating shaft 20 is disposed in the horizontal direction 90, it bends due to thermal expansion, its own weight, etc. As a result, a plane (reference plane) 94 of the thrust collar 50, which passes through the axial center of the rotating shaft 20 and is perpendicular to the rotating shaft 20, is inclined by a predetermined angle from the plane 92 perpendicular to the horizontal plane of the casing 24. Specifically, the rotating shaft 20 is inclined radially downward as it extends from the upstream side toward the downstream side in the axial direction. For this reason, the reference plane 94 of the thrust collar 50 is inclined relative to the rotating shaft 20, in the direction of moving toward the upstream side of the rotating shaft 20 as the thrust collar 50 extends from the radially upper side toward the radially lower side.

Here, in the thrust bearing mechanism 40, the adjusting liners 58, 60 are installed on the plane perpendicular to the horizontal plane of the casing 24 and the surfaces of the adjusting liners 58, 60 in contact with the thrust bearings 52, 54 are inclined in the same direction as the reference plane 94. That is, the surfaces of the adjusting liners 58, 60 on the side in contact with the thrust bearings 52, 54 are inclined in the direction orthogonal to the direction in which the rotating shaft 20 inclines. Thus, the surfaces of the thrust bearings 52, 54 facing the thrust collar 50 can be inclined according to the inclination of the thrust collar 50.

In this way, the thrust bearing mechanism 40 can uniformize the load applied from the thrust collar 50 to the thrust bearings 52, 54, more specifically, to the bearing pads 70, in the circumferential direction of the rotating shaft 20.

For example, when adjusting liners 96, 98 have a shape with a constant thickness in the circumferential direction as shown in FIG. 12, the surfaces of the thrust bearings 52, 54 facing the thrust collar 50 are parallel to the plane 92 perpendicular to the horizontal plane of the casing 24 but not parallel to the radial surfaces (surfaces orthogonal to the axial direction) of the thrust collar 50 which these surfaces of the thrust bearings 52, 54 face. Therefore, the load from the thrust collar 50 concentrates at one part of the thrust bearing 52 on the radially upper side and at one part of the thrust bearing 54 on the radially lower side, so that the load becomes non-uniform in the circumferential direction of the rotating shaft 20.

By contrast, as described above, since the thrust bearing mechanism 40 of this embodiment can uniformize the load applied from the thrust collar 50 to the thrust bearings 52, 54 in the circumferential direction of the rotating shaft 20, it is possible to prevent the load from concentrating at one part of the thrust bearings 52, 54, which would otherwise lead to a rise in metal temperature of a part of the bearing pads 70 and damage to the bearings. Thus, the durability of the gas turbine as a whole can be enhanced and its service life can be prolonged.

Figure 13:
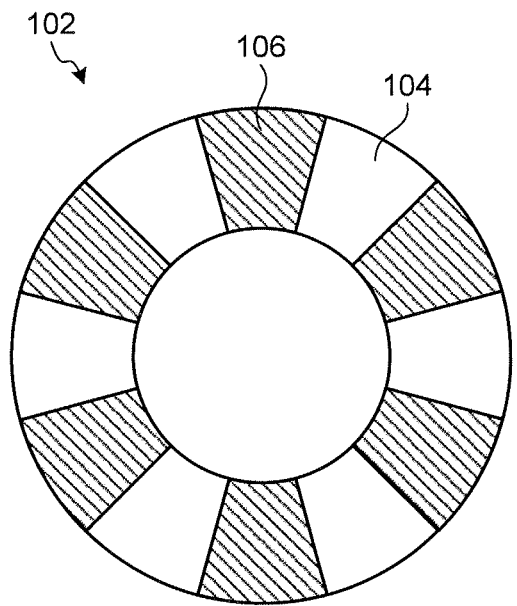
FIG. 13 is a front view showing the schematic configuration of an adjusting liner of a modified example.
Figure 14:
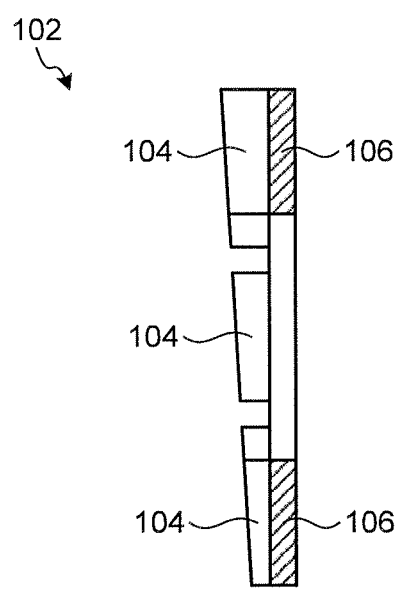
FIG. 14 is a side view showing the schematic configuration of the adjusting liner shown in FIG. 13.

FIG. 13 is a front view showing the schematic configuration of an adjusting liner of a modified example. FIG. 14 is a side view showing the schematic configuration of the adjusting liner shown in FIG. 13. In an adjusting liner 102 shown in FIG. 13 and FIG. 14, inclined portions 104, which change in thickness according to the radial position similarly to the above-described adjusting liner, and recessed portions 106, which have a smaller thickness than the inclined portions 104 and are constant in thickness regardless of the radial position, are disposed alternately in the circumferential direction. In the adjusting liner 102, those portions which come into contact with the thrust bearing and those portions which do not come into contact with the thrust bearing are provided alternately according to the circumferential position. Thus, it is not absolutely necessary that the entire circumference of the adjusting liner is in contact with the thrust bearing or the casing, as long as the adjusting liner can hold the relative positions of the thrust bearing and the casing at predetermined positions and can incline the axis of the thrust bearing in a direction according to the inclination of the rotating shaft 20 due to its own weight etc. relative to the horizontal direction. While the adjusting liner 102 shown in this modified example can be used for both the support mechanisms (first support mechanism and second support mechanism), it is necessary to use a pair of adjusting liners in combination which are mounted such that the directions in which the two adjusting liner change radially in thickness are opposite to each other.

In the above-described embodiment, the adjusting liners are used to incline the axis of the thrust bearings in a direction according to the inclination of the rotating shaft 20 due to its own weight etc. relative to the horizontal direction, and thereby the load applied from the thrust collar to the thrust bearings is prevented from concentrating at one part. However, the mechanism for adjusting the positions of the thrust bearings is not limited to this example. Various other mechanism can be used as the support mechanism as long as such mechanisms can incline the surfaces of the thrust bearings in contact with the thrust collar in a predetermined direction (above-described direction) relative to the plane perpendicular to the horizontal plane of the casing.

Figure 15:
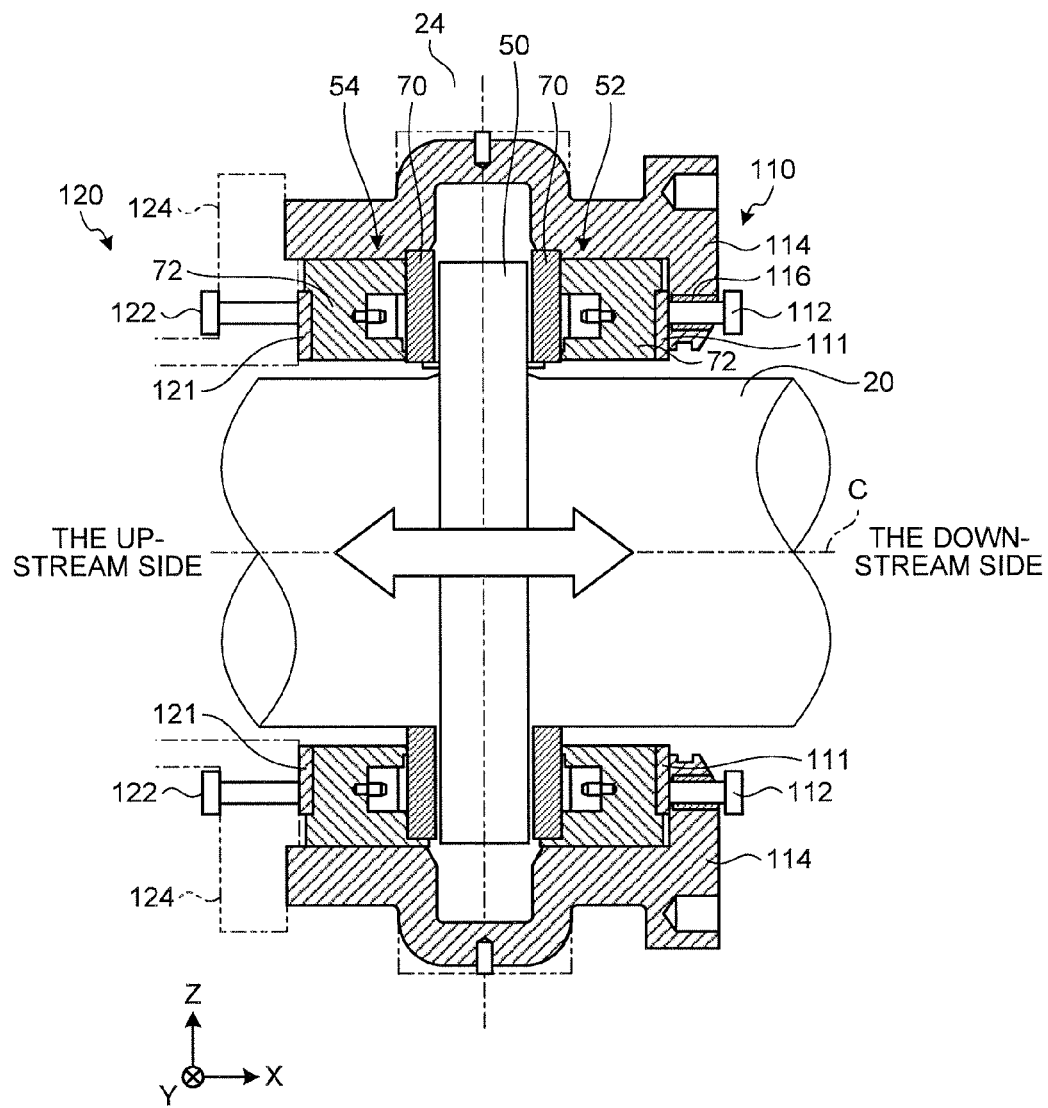
FIG. 15 is a cross-sectional view showing the schematic configuration of a thrust bearing mechanism of another embodiment.
Figure 16:
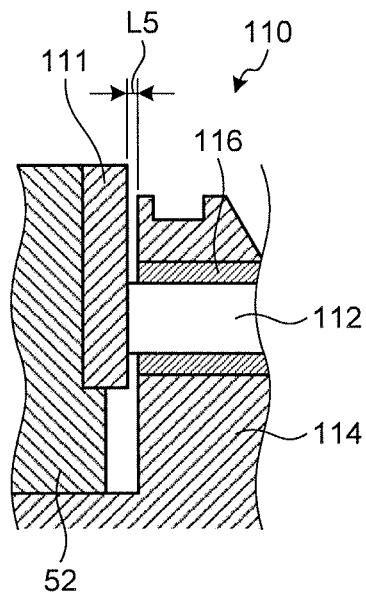
FIG. 16 is an enlarged cross-sectional view showing the support mechanism of the thrust bearing mechanism shown in FIG. 15.

FIG. 15 is a cross-sectional view showing the schematic configuration of a thrust bearing mechanism of another embodiment. FIG. 16 is an enlarged cross-sectional view showing the support mechanism of the thrust bearing mechanism shown in FIG. 15. A support mechanism 110 shown in FIG. 15 and FIG. 16 has an adjusting liner 111 and bolts 112. The adjusting liner 111 is a ring-shaped member having a constant thickness. The bolts 112 are inserted into bolt holes 116 formed in a casing 114. The plurality of bolts 112 and bolt holes 116 are disposed at predetermined intervals in the circumferential direction. In this embodiment, the bolts 112 and the bolt holes 116 constitute an adjustment mechanism for adjusting the orientation of the thrust bearing 52.

The end of the bolt 112 on the adjusting liner 111 side protrudes from the casing 114 toward the adjusting liner 111, and the protruding end comes into contact with the adjusting liner 111. Of the bolt 112 of this embodiment, the end on the adjusting liner 111 side protrudes by a distance L5 from the casing 114 toward the adjusting liner 111. The support mechanism 110 can change the amount of axial protrusion of the bolt 112 from the casing 114 according to the circumferential or radial position. As a result, the orientation, namely, the inclination of the adjusting liner 111, with which the bolt 112 comes into contact, relative to the plane perpendicular to the horizontal plane of the casing 114 can be adjusted. That is, the support mechanism 110 can orient the thrust bearing 52 with an inclination from the plane perpendicular to the horizontal plane of the casing 114 by adjusting the orientation of the adjusting liner 111 through the amount of axial travel of the bolt 112.

Thus, the support mechanism 110 of the configuration employing the bolts 112 can also incline the thrust bearing as with the above-described configuration. While the adjusting liner 111 is disposed in this embodiment, the adjusting liner 111 may be omitted and the bolts 112 may be brought into contact with the surface of the thrust bearing 52 on the downstream side in the axial direction. Since the support mechanism 110 can adjust the inclination by changing the amount of travel of the protruding end according to the circumferential position of the bolt 112, it is easy to make adjustment. In FIG. 15, to allow the support mechanism 110 shown in this embodiment to function, it is necessary to provide a support mechanism 120 on the upstream side in the axial direction relative to the support mechanism 110 which is disposed on the downstream side in the axial direction across the thrust collar 50. While the support mechanism 120 may have the same structure as the support mechanism 110, the support mechanism 120 should have such a structure that bolts 122 corresponding to the bolts 112 come into contact with an adjusting liner 121 from the upstream side toward the downstream side in the axial direction. The bolts 122 are inserted into bolt holes formed in a casing 124. These two support mechanisms 110, 120 should be used in combination as a pair of support mechanisms, disposed across the thrust collar 50, and adjusted such that the inclinations of the surfaces of the adjusting liners 111, 121 with which the bolts 112, 122 come into contact are opposite to each other in the radial direction.

Figure 17:
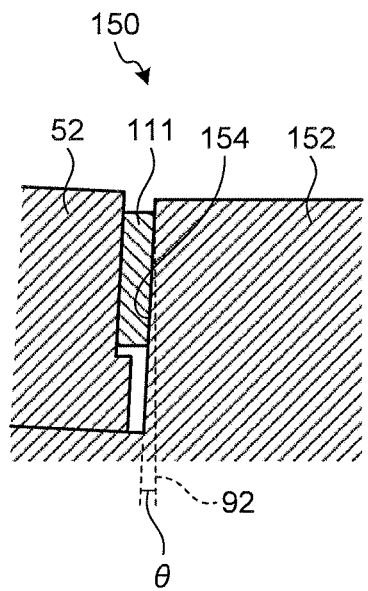
FIG. 17 is a cross-sectional view showing the schematic configuration of a thrust bearing mechanism of another embodiment.

FIG. 17 is a cross-sectional view showing the schematic configuration of a thrust bearing mechanism of another embodiment. A support mechanism 150 shown in FIG. 17 has the adjusting liner 111, and an end surface 154 of a casing 152 on the upstream side in the axial direction. The adjusting liner 111 is a ring-shaped member having a constant thickness. The end surface 154 of the casing 152 is the surface in contact with the adjusting liner 111, namely, the surface facing the thrust bearing 52. The end surface 154 is inclined by an angle 0 from the plane perpendicular to the horizontal plane of the casing 152.

Thus, the support mechanism 150 can incline the adjusting liner 111, which is in contact with the end surface 154 of the casing 152, and the thrust bearing 52 by the angle θ from the direction perpendicular to the horizontal plane of the casing 152 by inclining the end surface 154 by the angle 0 from the plane 92 perpendicular to the horizontal plane of the casing 152. The angle 0 is an inclination angle similar to that of the above-described embodiment.

Figure 18:
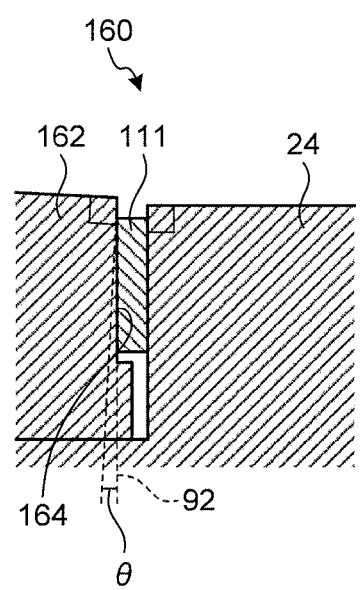
FIG. 18 is a cross-sectional view showing the schematic configuration of a thrust bearing mechanism of another embodiment.

FIG. 18 is a cross-sectional view showing the schematic configuration of a thrust bearing mechanism of another embodiment. A support mechanism 160 shown in FIG. 18 has the adjusting liner 111 and an end surface 164 of a thrust bearing 162. The adjusting liner 111 is a ring-shaped member having a constant thickness. The end surface 164 of the thrust bearing 162 is the surface in contact with the adjusting liner 111, namely, the surface facing the adjusting liner 111. The end surface 164 is inclined by the angle θ from the direction perpendicular to the horizontal plane of the casing 24.

Thus, even when the adjusting liner 111, which is in contact with the end surface 164 of the thrust bearing 162, and the thrust bearing 162 have the surfaces parallel to the plane 92 perpendicular to the horizontal plane of the casing 24, the support mechanism 160 can incline the thrust bearing 162 by the angle θ by inclining the end surface 164 by the angle θ from the plane 92 perpendicular to the horizontal plane of the casing 24. The angle θ is an inclination angle similar to that of the above-described embodiment.

To allow the support mechanisms 150, 160 shown in FIG. 17 and FIG. 18 to function as the original support mechanisms, support mechanisms of the same structure may be disposed on the upstream side and the downstream side in the axial direction across the thrust collar to use these support mechanisms in pair. In this embodiment, too, the support mechanisms should be disposed such that the directions of inclinations of the adjusting liners disposed on the upstream side and the downstream side in the axial direction across the thrust collar are radially opposite to each other.

While providing the end surfaces of the casing and the thrust bearing with an inclination as shown in FIG. 17 and FIG. 18 can also prolong the service life of the thrust bearing, providing an inclination using the adjusting liner which changes radially in thickness allows easy adjustment.

REFERENCE SIGNS LIST

10 Gas turbine
12 Compressor
14 Combustor
16 Turbine
18, 19 Bearing device
20 Rotating shaft
22 Blade
24 Casing
26 Vane
30 Journal bearing mechanism
40 Thrust bearing mechanism (rotating shaft support structure)
50 Thrust collar
52, 54 Thrust bearing
56, 110 Support mechanism
58 Adjusting liner (first support mechanism)
60 Adjusting liner (second support mechanism)
70 Bearing pad
71, 84 Pivot
72 Leveling mechanism
76 Upper leveling plate
78 Lower leveling plate
80 Connection pin
82 Movement stop pin
74 Housing
102 Adjusting liner

The invention claimed is:

1. A rotating shaft support structure for supporting a rotating shaft having a thrust collar protruding radially outward therefrom, the rotating shaft support structure comprising:
   a thrust bearing which faces the thrust collar and supports the surface of the thrust collar orthogonal to the axial direction of the rotating shaft by a support surface; and
   a support mechanism which supports the thrust bearing in the axial direction from the side opposite to the support surface supporting the thrust collar, wherein
   the side of the support mechanism facing the end surface of the thrust bearing is inclined in a direction orthogonal to a direction in which the rotating shaft inclines.

2. The rotating shaft support structure according to claim 1, wherein
   the thrust bearing is disposed on both sides in the axial direction across the thrust collar so as to face two surfaces, an upstream-side surface and a downstream-side surface, respectively, of the thrust collar orthogonal to the axial direction,
   the support mechanism is composed of a first support mechanism disposed, in an extension direction of the rotating shaft, further on the downstream side than the thrust bearing disposed on the downstream side of the thrust collar, and a second support mechanism disposed, in the extension direction of the rotating shaft, further on the upstream side than the thrust bearing disposed on the upstream side of the thrust collar, the first support mechanism is disposed such that the surface facing the upstream side faces the end surface in the axial direction of the thrust bearing disposed on the downstream side of the thrust collar, and that the surface facing the upstream side inclines toward the upstream side as it extends radially downward, and the second support mechanism is disposed such that the surface facing the downstream side in the axial direction faces the end surface in the axial direction of the thrust bearing disposed on the upstream side of the thrust collar, and that the surface facing the downstream side inclines toward the downstream side in the axial direction as it extends radially upward.

3. The rotating shaft support structure according to claim 2, wherein the first support mechanism and the second support mechanism each include an adjusting liner fixed on the thrust bearing, the adjusting liner changes gradually in thickness from the end in the radial direction toward the opposite end in the radial direction around the rotating shaft, and the adjusting liner of the first support mechanism is disposed such that the direction in which the thickness changes radially is opposite to that of the adjusting liner of the second support mechanism.

4. The rotating shaft support structure according to claim 3, wherein the thrust bearing has:
a plurality of pads which are disposed on the support surface in the circumferential direction of the rotating shaft and slide with the thrust collar; and
pad support means which supports the pads from the surface opposite to the support surface and is supported by the support mechanism, and the pad support means supports the pads so as to be movable relative to a plane perpendicular to the rotating shaft.

5. The rotating shaft support structure according to claim 2, wherein the thrust bearing has:
a plurality of pads which are disposed on the support surface in the circumferential direction of the rotating shaft and slide with the thrust collar; and
pad support means which supports the pads from the surface opposite to the support surface and is supported by the support mechanism, and the pad support means supports the pads so as to be movable relative to a plane perpendicular to the rotating shaft.

6. The rotating shaft support structure according to claim 1, wherein the support mechanism includes an adjusting liner fixed on the thrust bearing, and the adjusting liner changes gradually in thickness from the end in the radial direction toward the opposite end in the radial direction around the rotating shaft.

7. The rotating shaft support structure according to claim 6, wherein the thrust bearing has:

a plurality of pads which are disposed on the support surface in the circumferential direction of the rotating shaft and slide with the thrust collar; and pad support means which supports the pads from the surface opposite to the support surface and is supported by the support mechanism, and the pad support means supports the pads so as to be movable relative to a plane perpendicular to the rotating shaft.

8. The rotating shaft support structure according to claim 1, wherein the support mechanism has:

a casing in which the rotating shaft is held and which is disposed on the side of the thrust bearing opposite to the support surface; and an adjustment mechanism having a plurality of bolts which are inserted into the casing and of which the end surfaces on the thrust bearing side are in contact with the thrust bearing, and in the adjustment mechanism, the plurality of bolts are disposed around the rotating shaft, and the amount of travel of the bolts protruding from the casing varies according to the position of the bolts around the rotating shaft.

9. The rotating shaft support structure according to claim 8, wherein the thrust bearing has:
a plurality of pads which are disposed on the support surface in the circumferential direction of the rotating shaft and slide with the thrust collar; and
pad support means which supports the pads from the surface opposite to the support surface and is supported by the support mechanism, and the pad support means supports the pads so as to be movable relative to a plane perpendicular to the rotating shaft.

10. The rotating shaft support structure according to claim 1, wherein the support mechanism has a casing in which the rotating shaft is held and which is disposed on the side of the thrust bearing opposite to the support surface, the casing supports the thrust bearing from the surface opposite to the support surface, and the supporting surface of the casing is inclined from the radial direction.

11. The rotating shaft support structure according to claim 10, wherein the thrust bearing has:
a plurality of pads which are disposed on the support surface in the circumferential direction of the rotating shaft and slide with the thrust collar; and
pad support means which supports the pads from the surface opposite to the support surface and is supported by the support mechanism, and the pad support means supports the pads so as to be movable relative to a plane perpendicular to the rotating shaft.

12. The rotating shaft support structure according to claim 1, further comprising a casing in which the rotating shaft is held and which is disposed on a side of the thrust bearing opposite to the support surface, wherein the support surface is inclined from the vertical direction which is perpendicular to a horizontal plane of the casing.

13. The rotating shaft support structure according to claim 1, wherein the thrust bearing has:
a plurality of pads which are disposed on the support surface in the circumferential direction of the rotating shaft and slide with the thrust collar; and
pad support means which supports the pads from the surface opposite to the support surface and is supported by the support mechanism, and the pad support means supports the pads so as to be movable relative to a plane perpendicular to the rotating shaft.

\* \* \* \* \*